(12) United States Patent
Kulbeth

(10) Patent No.: US 11,634,953 B1
(45) Date of Patent: Apr. 25, 2023

(54) FLOW BACK SEPARATION SYSTEM AND METHOD

(71) Applicant: DEL Corporation, Lafayette, LA (US)

(72) Inventor: Robert M. Kulbeth, Church Point, LA (US)

(73) Assignee: DEL Corporation, Lafayette, LA (US)

( * ) Notice: Subject to any disclaimer, the term of this patent is extended or adjusted under 35 U.S.C. 154(b) by 0 days.

(21) Appl. No.: 17/719,530

(22) Filed: Apr. 13, 2022

Related U.S. Application Data

(63) Continuation of application No. 16/910,952, filed on Jun. 24, 2020, now Pat. No. 11,326,406, which is a continuation of application No. 16/227,417, filed on Dec. 20, 2018, now Pat. No. 10,751,654.

(60) Provisional application No. 62/608,820, filed on Dec. 21, 2017.

(51) Int. Cl.
*E21B 21/06* (2006.01)
*B01D 36/04* (2006.01)

(52) U.S. Cl.
CPC ............ *E21B 21/065* (2013.01); *B01D 36/04* (2013.01); *B01D 36/045* (2013.01)

(58) Field of Classification Search
CPC ...... E21B 21/065; B01D 36/04; B01D 36/045
See application file for complete search history.

(56) References Cited

U.S. PATENT DOCUMENTS

| | | | |
|---|---|---|---|
| 4,247,312 A | 1/1981 | Thakur et al. | |
| 4,274,963 A * | 6/1981 | Purvis | B01D 21/2461 210/523 |
| 6,506,310 B2 | 1/2003 | Kulbeth | |
| 6,808,626 B2 | 10/2004 | Kulbeth | |
| 6,976,819 B2 | 12/2005 | Kulbeth | |
| 7,514,011 B2 | 4/2009 | Kulbeth | |
| 8,449,779 B2 | 5/2013 | Thompson | |
| 8,517,167 B2 | 8/2013 | Thompson | |
| 8,808,354 B2 | 8/2014 | Caro et al. | |
| 9,498,739 B2 | 11/2016 | Thompson | |
| 9,597,614 B2 | 3/2017 | Thompson | |
| 9,687,761 B2 | 6/2017 | Thompson | |
| 10,751,654 B1 | 8/2020 | Kulbeth | |
| 11,326,406 B1 * | 5/2022 | Kulbeth | E21B 43/40 |
| 2004/0208732 A1 * | 10/2004 | Kulbeth | B65G 65/46 414/326 |
| 2005/0040119 A1 | 2/2005 | Kulbeth | |
| 2012/0318583 A1 | 12/2012 | Krohn | |

OTHER PUBLICATIONS

Applicant's copending U.S. Appl. No. 16/393,718, filed Apr. 24, 2019.

(Continued)

*Primary Examiner* — Brad Harcourt
(74) *Attorney, Agent, or Firm* — Jones Walker LLP

(57) ABSTRACT

A flow back system for separating solids from a slurry recovered from a hydrocarbon well. The system includes a V-shaped tank with a first series of baffles configured to cause the settling of solids that are moved by a shaftless auger to a conduit fluidly connected to hydrocyclones mounted over a linear shaker. The overflow from the hydrocyclones is discharged through a second conduit back into the tank for processing by a second series of baffles resulting in a clean effluent. The clean effluent is recirculated in the well.

31 Claims, 10 Drawing Sheets

(56) References Cited

OTHER PUBLICATIONS

Applicant's copending U.S. Appl. No. 16/529,513, filed Aug. 1, 2019.
Applicant's copending U.S. Appl. No. 16/910,952, filed Jun. 24, 2020.

* cited by examiner

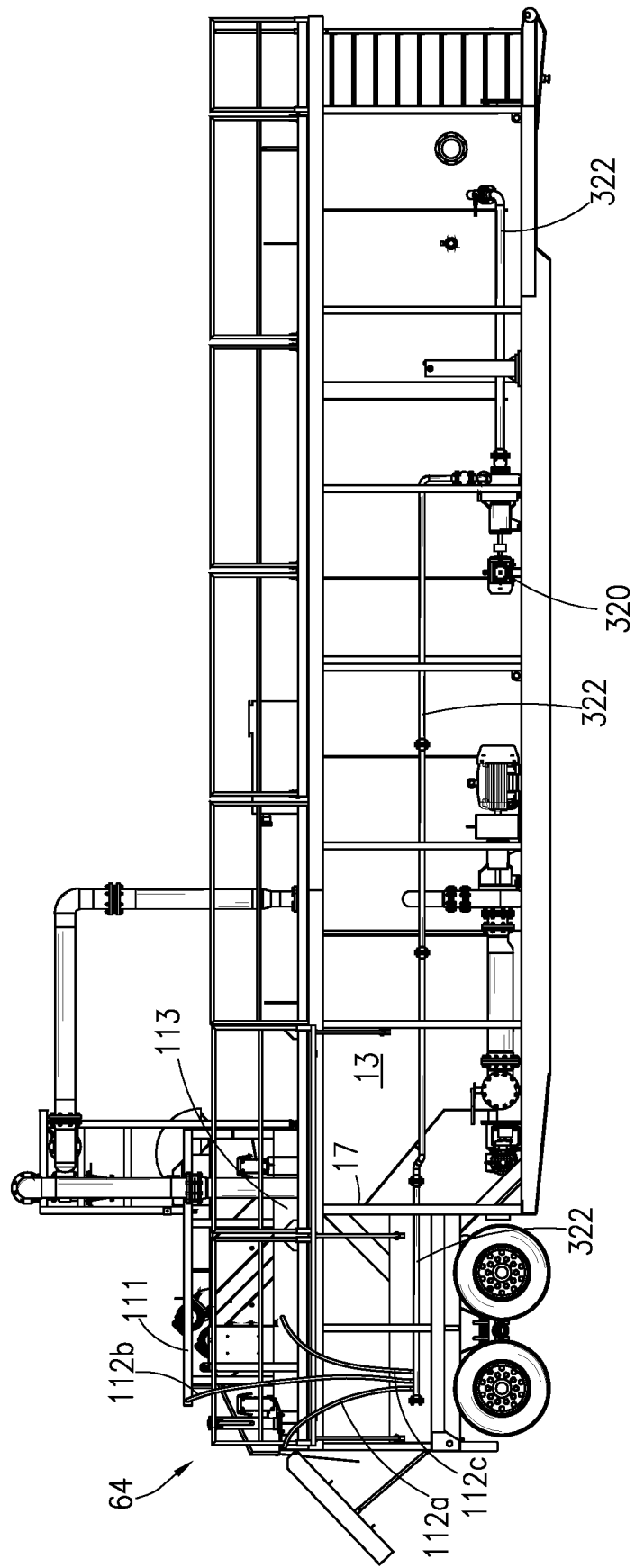

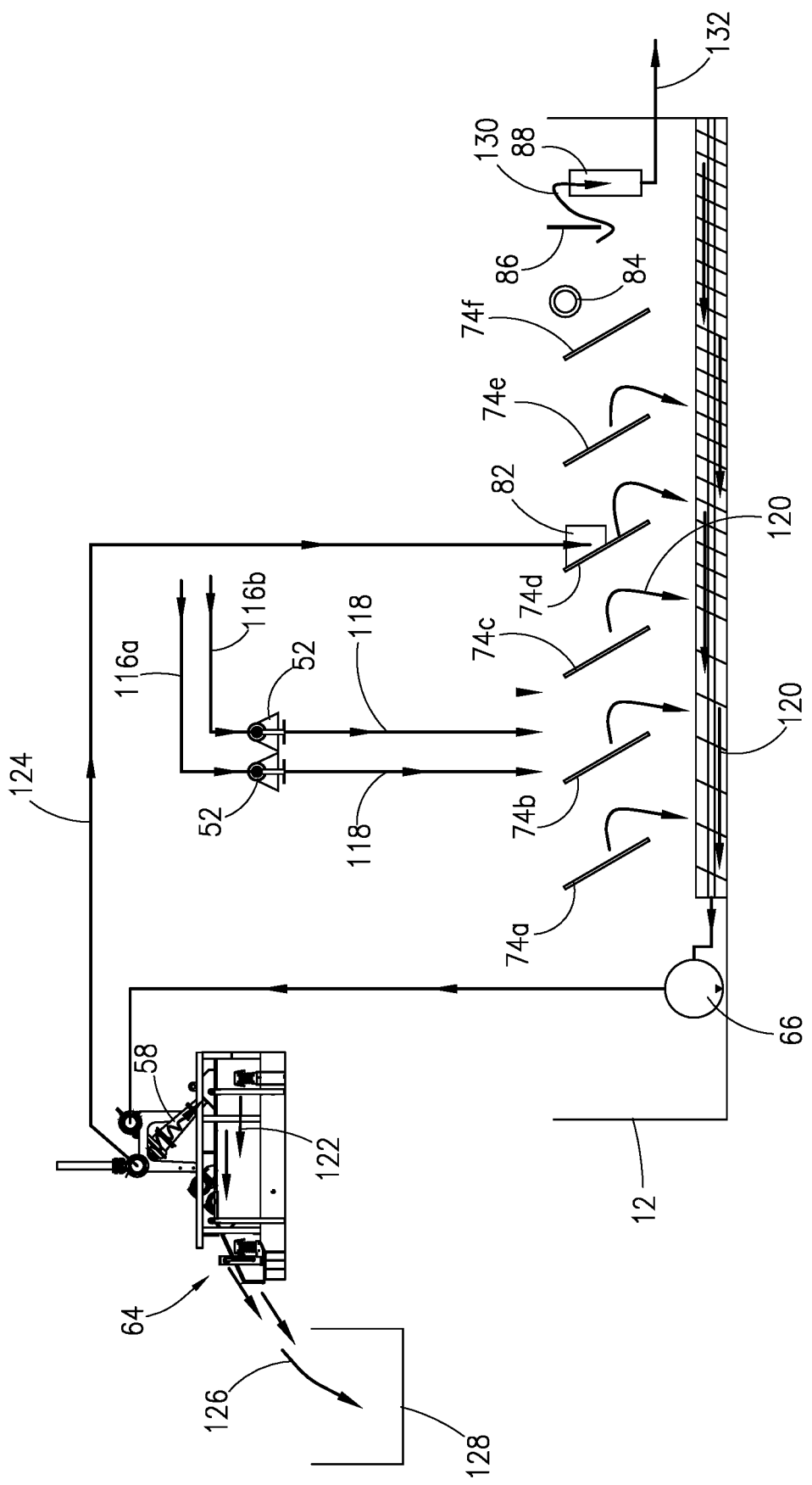

FLOW BACK SEPARATION SYSTEM AND METHOD

CROSS-REFERENCE TO RELATED APPLICATIONS

This application is a continuation of and claims priority to U.S. patent application Ser. No. 16/910,952, filed on Jun. 24, 2020, which is a continuation of and claims priority to U.S. patent application Ser. No. 16/227,417, filed on Dec. 20, 2018, which claims priority to U.S. Provisional Patent Application No. 62/608,820, filed on Dec. 21, 2017, each of which is incorporated herein by reference.

BACKGROUND OF THE INVENTION

The disclosure relates to a flow back separation system and method for separating solids from a fluid.

SUMMARY OF THE INVENTION

The disclosure relates to a system for separating solids from a slurry recovered from a hydrocarbon well.

In one embodiment, the system may include a tank having a V-shaped compartment with sloping side walls, a bottom, and a top. The compartment may have a front section, a mid-section, and a rear section. The system may include one or more degassing units operatively positioned over the top of the compartment. The one or more degassing units may remove an entrained gas from the slurry and discharge a first slurry. The system may include a first series of baffles operatively positioned within the compartment at its mid-section and below the one or more degassing units. The first series of baffles may cause a first settling of a first solids within the first slurry. The system may include a shaftless auger operatively positioned on the bottom of the compartment. The shaftless auger may be configured for rotation to cause the first solids to move to the rear section of the compartment. The system may include a suction pump in fluid communication with a first conduit. The first conduit may have an inlet and an outlet. The inlet of the first conduit may be operatively positioned within the compartment at its rear section adjacent the shaftless auger. The suction pump may be configured to pump a second slurry containing the first solids through the first conduit. The system may include one or more hydrocyclone units in fluid communication with the outlet of the first conduit. The one or more hydrocyclone units may receive and process the second slurry to produce an overflow comprising a first clean fluid and an underflow comprising the first solids. The system may include a linear shaker operatively positioned underneath the one or more hydrocyclone units. The linear shaker may be configured to receive the underflow from the one or more hydrocyclone units and to cause a dewatering of the first solids to produce a dried first solids. The linear shaker may be further configured to convey the dried first solids to a storage device for disposal. The linear shaker may produce an underflow comprising a third slurry comprising a second solids. The linear shaker may be configured for depositing the third slurry into the compartment at its rear section for recirculation through the first conduit to the one or more hydrocyclone units. The system may include a second conduit having an inlet and an outlet. The inlet of the second conduit may be in operative association with the one or more hydrocyclones to receive and provide a flow path for the overflow comprising the first clean fluid. The outlet of the second conduit may be operatively positioned within the compartment at its mid-section for discharge of the overflow comprising the first clean fluid therein. The system may include a second series of baffles operatively positioned within the compartment at its front section. The second series of baffles may cause a second settling of a third solids. The third solids may be moved to the rear section of the compartment by the rotation of the shaftless auger. The system may include an underflow weir operatively positioned within the compartment at its front section directly adjacent to a last baffle comprising the second series of baffles. The underflow weir may be configured to cause the first clean fluid to flow under the underflow weir. The system may include an overflow pipe operatively positioned within the compartment at its front end directly adjacent to the underflow weir. The overflow pipe may be configured to provide an outlet for the first clean fluid to exit the tank.

In another embodiment, the rear section of the V-shaped compartment may include a sloped internal wall. The sloped internal wall may be configured to provide a pathway for the underflow from the one or more hydrocyclone units so that the first solids settle approximate the inlet of the first conduit.

In another embodiment, the angle of the sloped internal wall may be in the range of 30 degrees to 90 degrees relative to a horizontal ground reference.

In another embodiment, the system may include a possum belly operatively positioned within the compartment at its mid-section directly adjacent the outlet of the second conduit. The possum belly may be perforated to permit the overflow discharged from the outlet of the second conduit to flow there-through.

In another embodiment, the system may include an oil skimmer operatively positioned within the compartment at its front section between the last baffle comprising the second series of baffles and the underflow weir.

In another embodiment, the oil skimmer may be a horizontal oil skimmer or a vertical oil skimmer In another embodiment, the system may include one or more oil skimmers positioned within the V-shaped compartment at its back section.

In another embodiment, the one or more oil skimmers may include two oil skimmers respective positioned on a first side and a second side of the V-shaped compartment.

In another embodiment, the system may include a back baffle positioned at the back section of the V-shaped compartment extending behind the one or more oil skimmers at the back section of the V-shaped compartment, the back baffle configured to direct flow of the first clean fluid to the one or more oil skimmers.

In another embodiment of the system, the shaftless auger may comprise a full pitch section and a half pitch section. The half pitch section may be operatively positioned at the front section of the compartment. The full pitch section may be operatively positioned at the rear section of the compartment. The full pitch section may comprise a first series of flights, each flight spaced apart from an adjacent flight by a distance in the range of 9 inches to 18 inches. The half pitch section may comprise a second series of flights, each flight spaced apart from an adjacent flight by a distance in the range of 4.5 inches to 9 inches.

In another embodiment of the system, the first series of baffles may comprise three baffles.

In another embodiment of the system the second series of baffles may comprises three baffles.

In another embodiment of the system, the one or more degassing units may comprise two or more degassing units.

In another embodiment of the system, the one or more hydrocyclone units may comprise two or more hydrocyclone units.

In another embodiment of the system, the linear shaker may have a proximal end that discharges the underflow. The proximal end may be operatively positioned at the rear section of the V-shaped compartment.

In another embodiment, the system may include a slide operatively associated with a distal end of the linear shaker. The slide may be configured to receive the dried first solids from the linear shaker and discharge the dried first solids into the storage device.

In another embodiment of the system, the first series of baffles may be slanted in a first direction and the second series of baffles may be slanted in a second direction.

In another embodiment, the system may include a deck operatively positioned over the top of the V-shaped compartment.

In another embodiment, the system may include a guard rail extending around a periphery of the deck.

In another embodiment, the system may include a support frame operatively positioned about and supporting the tank.

In another embodiment, the system may include a plurality of wheels operatively associated with the support frame. The plurality of wheels may be positioned at a back of the tank. The plurality of wheels may provide mobile transport of the tank.

In another embodiment, the system may include a spray bar pump in fluid communication with a spray bar conduit, wherein the spray bar pump is configured to pump the first clean fluid from the front end of the compartment to the linear shaker via the spray bar conduit.

In another embodiment, wherein the linear shaker may include one or more slotted pipes in fluid communication with the spray bar conduit, the one or more slotted pipes being operatively positioned adjacent a bed of the linear shaker, the one or more slotted pipes being configured to discharge a portion of the first clean fluid into the bed to prevent a buildup of the second solids.

The disclosure also relates to a method for separating solids from a slurry recovered from a hydrocarbon well. The method may include the step of providing a tank as described hereinabove. The method may include the step of pumping the slurry to the one or more degassing units. The one or more degassing units removing the entrained gas from the slurry to produce the first slurry. The method may include the step of discharging the first slurry from the one or more degasser units into the compartment. The first slurry contacting one or more of the first series of baffles to cause the first settling of the first solids. The method may include the step of moving the first solids to the rear section of the compartment by rotation of the shaftless auger. The method may include the step of pumping the second slurry containing the first solids through the first conduit to the one or more hydrocyclone units. The method may include the step of processing the second slurry in the one or more hydrocyclone units to produce an overflow comprising a first clean fluid and an underflow comprising the first solids. The method may include the step of depositing the underflow comprising the first solids onto the linear shaker. The method may include the step of dewatering the underflow comprising the first solids to produce a dried first solids. The method may include the step of causing the linear shaker to produce an underflow comprising a third slurry, the third slurry comprising the second solids. The method may include the step of depositing the third slurry into the compartment at its rear section for recirculation through the first conduit to the one or more hydrocyclone units. The method may include the step of pumping the overflow comprising the first clean fluid through the second conduit and discharging the overflow comprising the first clean fluid into the compartment at its mid-section. The method may include the step of contacting the overflow comprising the first clean fluid with the second series of baffles to cause the second settling of the third solids. The method may include the step of moving the third solids to the rear section of the compartment by rotation of the shaftless auger. The method may include the step of flowing the first clean fluid under the underflow weir and into the overflow pipe so that the first clean fluid exits the tank.

In another embodiment, the method may include the step of flowing the first clean fluid to a frac tank.

In another embodiment, the method may include the step of recirculating the first clean fluid down the well.

In another embodiment, the system includes a perforated possum belly operatively positioned with the compartment at its mid-section directly adjacent the outlet of the second conduit, and the method may include the step of where the overflow comprising the first clean fluid is discharged into the possum belly.

In another embodiment, the system includes an oil skimmer operatively positioned within the compartment at its front section between the last baffle comprising the second series of baffles and the underflow weir, and the method may include the step of skimming an oil on the surface of the first clean fluid.

In another embodiment, the oil skimmer may be a vertical oil skimmer or a horizontal oil skimmer, and the step of skimming is performed with the vertical oil skimmer or the horizontal oil skimmer.

In another embodiment, the system may include one or more oil skimmers positioned within the V-shaped compartment at its back section, and a back baffle positioned at the back section of the V-shaped compartment extending behind the one or more oil skimmers at the back section of the V-shaped compartment, and the method further comprising the step of skimming an oil on the surface of the first clean fluid.

In another embodiment, the one or more oil skimmers may comprise two oil skimmers respectively positioned on a first side and as second side of the V-shaped compartment, and the step of skimming may be performed with the two oil skimmers.

In another embodiment, the system includes a spray bar pump in fluid communication with a spray bar conduit, and the method may include the step of pumping, by the spray bar pump, the first clean fluid from the front end of the compartment to the linear shaker via the spray bar conduit.

In another embodiment, the system may include one or more slotted pipes in fluid communication with the spray bar conduit, the one or more slotted pipes being operatively positioned adjacent a bed of the linear shaker, and wherein the method further comprises the step of discharging via the slotted pipes a portion of the pumped first clean fluid into the bed.

BRIEF DESCRIPTION OF THE DRAWINGS

FIG. 6 is a partial cross-sectional right-side view of an embodiment of the flow back separation system.

FIG. 8 is schematic diagram of an embodiment of the flow back separation system.

DETAILED DESCRIPTION OF THE DISCLOSURE

Figure 1:
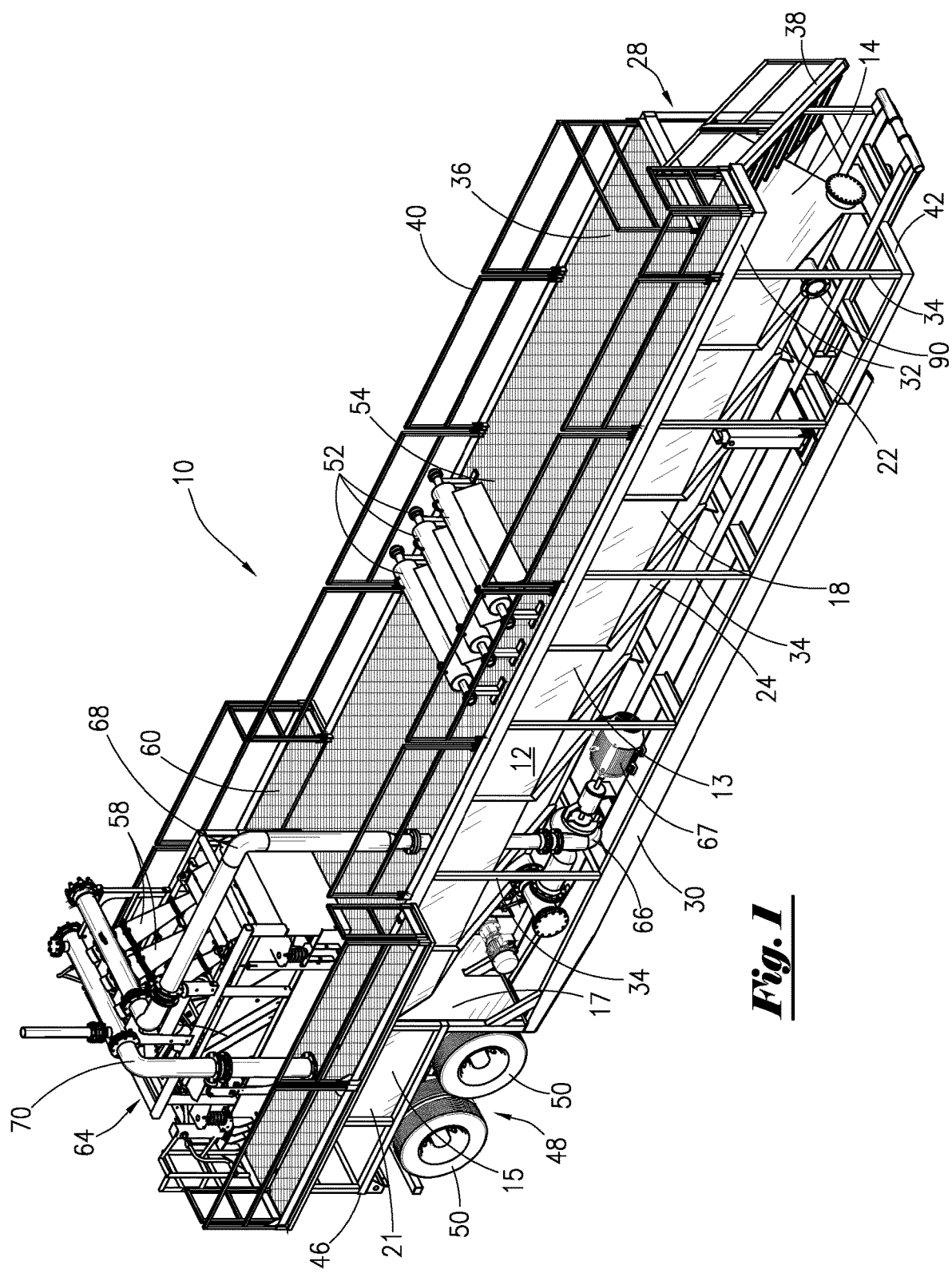
FIG. 1 is a perspective right-side view of an embodiment of the flow back separation system.
Figure 2:
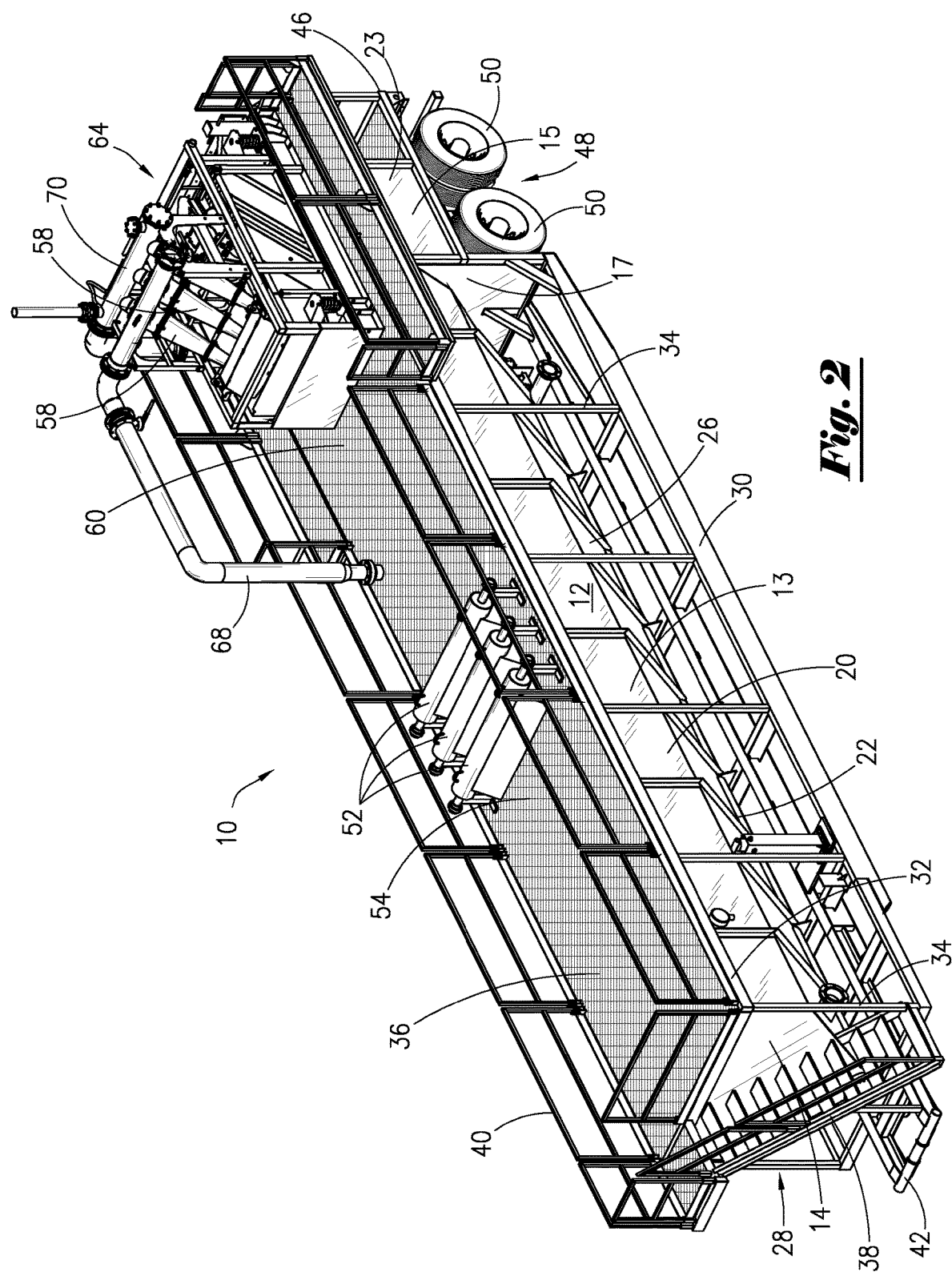
FIG. 2 is a perspective left-side view of an embodiment of the flow back separation system.
Figure 3:
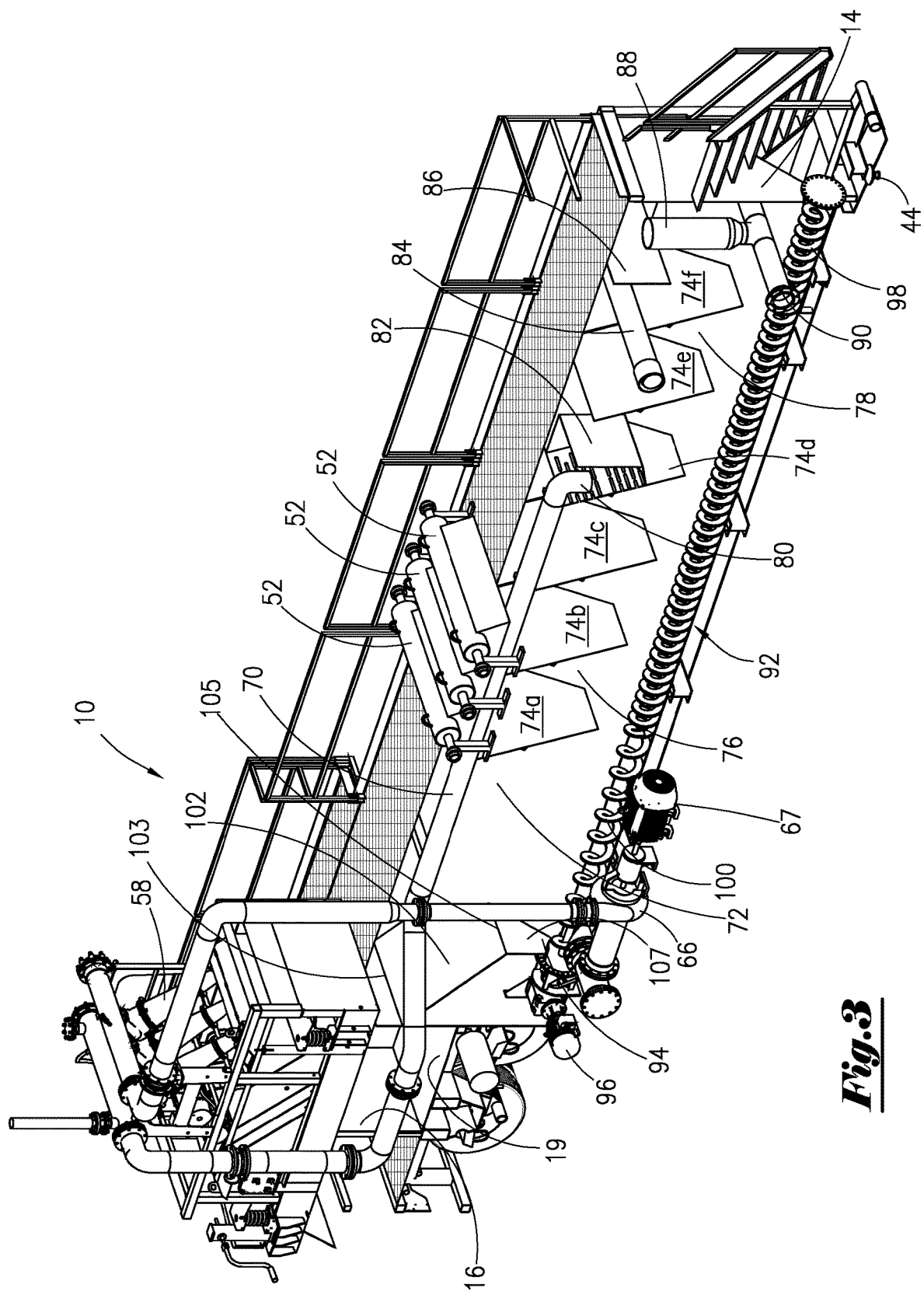
FIG. 3 is a partial cross-sectional perspective view of an embodiment of the flow back separation system.

With reference to the figures where like elements have been given like numerical designation to facilitate an understanding of the disclosure, and particularly with reference to the embodiment of the disclosure illustrated in FIGS. 1, 2, and 3, flow back separation system 10 may include tank 12. Tank 12 may have an open top. Tank 12 may include front wall 14 and rear wall 16. Tank 12 may include first compartment 13 and second compartment 15 divided by internal wall 17. In some situations, second compartment 15 may be substantially sealed off or isolated from first compartment 13, such that contents of either compartment 13, 15 do not directly flow from one compartment to the other compartment. First compartment 13 may be defined by front wall 14, internal wall 17, right side wall 18, left side wall 20, and bottom wall 22. First compartment 13 may be V-shaped or partially V-shaped. First compartment 13 may be configured with tapering or V-shaped right and left side walls 18, 20. Right and left side walls 18, 20 may each include lower section 24, 26 tapering in the direction of bottom wall 22. Front wall 14 may be substantially vertical. The angle of lower sections 24, 26 may be in the range of 30 degrees to 90 degrees relative to the horizontal ground.

As seen in FIGS. 1-3, second compartment 15 may be defined by internal wall 17, rear wall 16, bottom wall 19, right side wall 21, and left side wall 23. Internal wall 17 may contain angled or sloped side section 102 extending from top edge 103 to lower edge 105. Internal wall 17 may also contain lower vertical section 107 extending from lower edge 105 to bottom wall 22 in first compartment 13. The angle of sloped side section 102 may be in the range from 30 degrees to 90 degrees relative to the horizontal ground.

Tank 12 may have a height in the range of 6 feet to 10 feet, a length in the range of 30 feet to 50 feet, and a width in the range of 8 feet to 12 feet. Tank 12 may hold a volume of slurry in the range of 4,200 gallons to 45,000 gallons. Tank 12 may be composed of metal.

Again with reference to FIGS. 1-3, tank 12 may be housed within supporting frame 28. Supporting frame may be made of metal and comprise a unitary construction or be constructed with component parts that may be fixedly (e.g., by welding) or detachably secured (by bolts, rivets or the like). Supporting frame 28 may include bottom horizontal frame 30 and top horizontal frame 32. Bottom and top horizontal frames 30, 32 may be interconnected by a plurality of vertical support members 34. Top horizontal frame 32 supports deck 36 that is positioned above the open top of tank 12. Deck 36 is accessible to personnel operating system 10 by stairway 38. Guardrail 40 may extend around the periphery of deck 36.

With reference again to FIGS. 1-3, system 10 may be configured to be transportable. For example, front end 42 of bottom frame 30 may include hitch member 44 for connection to a towing vehicle such as a truck. Back end 46 of bottom frame 30 may be affixed with a wheel assembly 48 that includes two or more wheels 50. As seen in FIGS. 1-3, wheel assembly 48 includes eight wheels 50. The towing vehicle may lift front end 42 so that bottom frame 30 is positioned above the ground with only wheels 50 in contact with the ground. System 10 can then be transported to and from the work site.

When fully assembled, system 10 may have overall dimensions that include a height in the range of about 9 feet to about 20 feet, a length in the range of about 30 feet to about 55 feet, a width in the range of about 8 feet to about 13 feet.

Figure 4A:
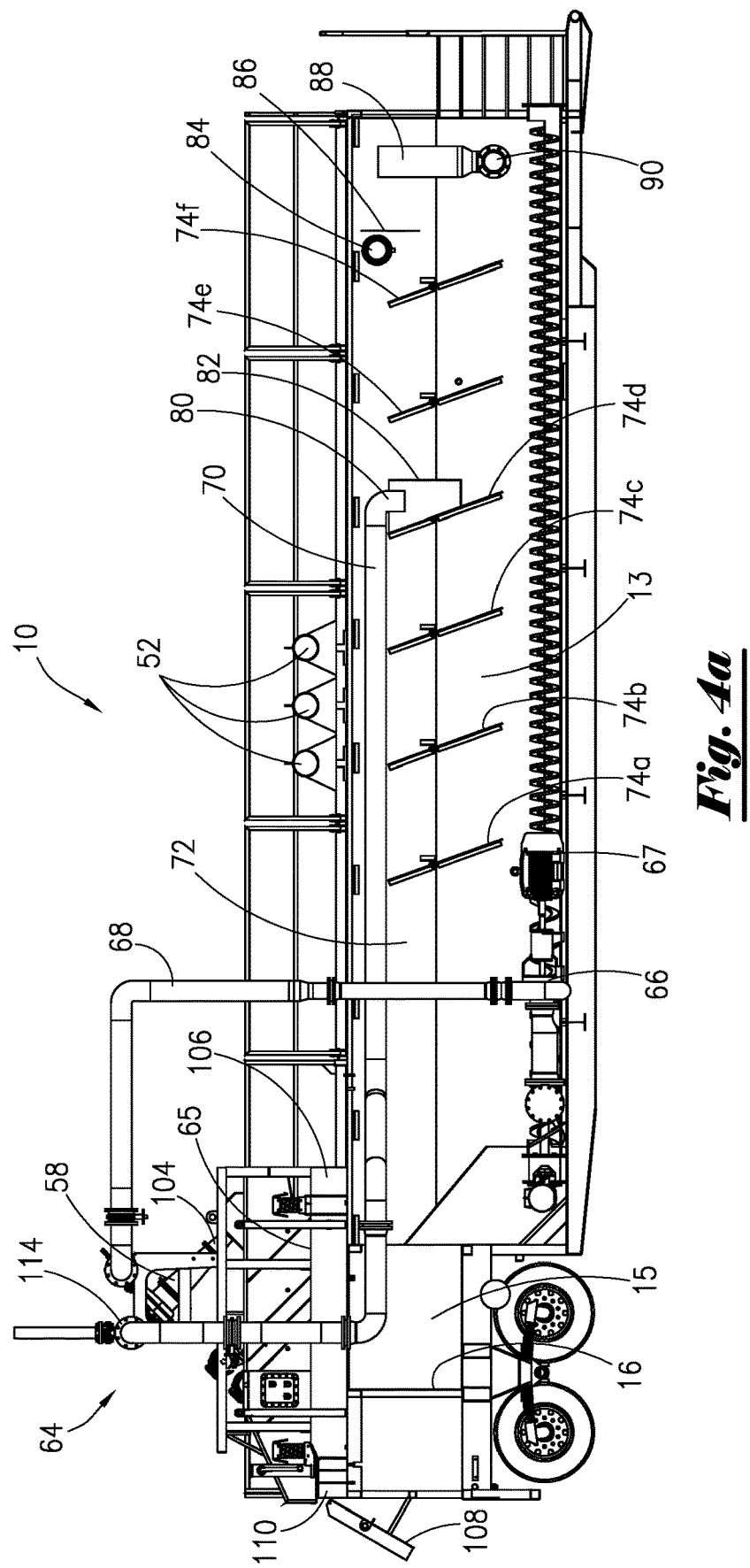
FIG. 4a is a partial cross-sectional right-side view of an embodiment of the flow back separation system.
Figure 4B:
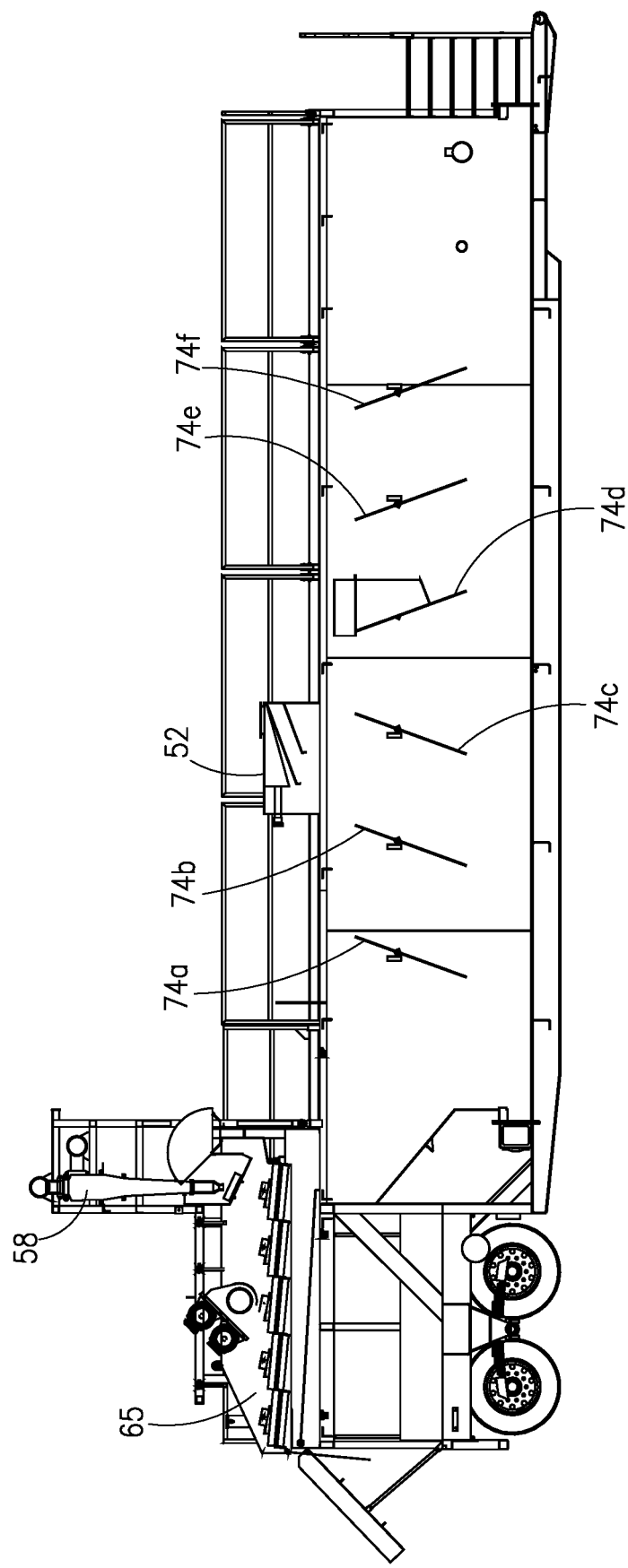
FIG. 4b is a partial cross-sectional right-side view of an embodiment of the flow back separation system.

With reference to FIGS. 1-3, system 10 may include one or more degassers 52 (known as "gas busters") operatively positioned at mid-deck section 54 on deck 36. FIGS. 1 and 2 depict system 10 with three degassers 52. It is to be understood that less than three or more than three degassers 52 may be incorporated into system 10 depending on operational parameters. For example, there may be two degassers 52. In some embodiments, one or more degassers 52 may be active and in current operation while one or more other degassers 52 may act as a standby unit (i.e., not in current operation). Degassers 52 each receive fluid containing solids (such as slurry 116 from a hydrocarbon well) and functions to remove entrained gas present in the fluid. After removing entrained gas, degassers 52 discharge the degassed fluid containing solids (slurry 118) into compartment 13 of tank 12. Degassers 52 may have an open bottom permitting discharge of the degassed fluid containing solids. Degasser 52 may comprise a vessel containing a series of internal baffles with a liquid exit on the bottom and a gas-vent line at the top. Degassers 52 may be oriented in a first orientation, such as substantially horizontally oriented as shown in FIG. 4a. Degassers 52 may be oriented in other orientations, such as a second orientation, which may be a 90 degree rotation from the first orientation. The second orientation is shown in FIG. 4b. Other orientations are possible. For example, degassers 52 may be substantially vertically oriented. In some embodiments, degassers 52 may include at least one horizontal degasser 52 and at least one vertical degasser 52. Degassers 52 are commercially available from DEL Corporation under trade name Gas Buster.

As also shown in FIGS. 1-3, system 10 may include one or more hydrocyclones 58 operatively positioned at rear deck section 60 on deck 36 and operatively mounted over linear shaker 64. Hydrocyclones 58 are commercially available from Krebs Engineering, Inc. under the trade name Cyclone. FIGS. 1 and 2 show system 10 with three hydrocyclones 58. It is to be understood that less than three or more than three hydrocyclones 58 may be incorporated into system 10 depending on operational parameters. Hydrocyclones 58 function to separate solids from fluid within the slurry. Hydrocyclones 58 works particularly well in separating sand and silt from fluid streams. The underflow of hydrocyclones 58 contains the separated solids. The overflow contains the processed fluid in which solids have been removed or substantially removed. As shown in FIGS. 1-4a, hydrocyclones 58 may be tilted at an angle relative to the ground. In an alternative embodiment, hydrocyclones 58 may be substantially vertically placed, as shown in FIG. 4b. Hydrocyclones 58 may be connected in a rack assembly that may be foldable for transport.

FIGS. 1-3 also illustrate that system 10 may include hydrocyclone feed pump 66 that suctions the solids settling at the bottom of compartment 13 of tank 12 and pumps through conduit 68 to hydrocyclones 58 for processing. Hydrocyclone feed pump 66 may be any type of pump capable of generating pressures sufficient to pump the slurry to the hydrocyclones 58. For example, pump 66 may be a centrifugal pump operated by motor 67. Motor 67 may be an electric motor. It is to be understood that other types of pump motors may be used in system 10 such as a pneumatic or hydraulic motor. In some cases, hydrocyclone feed pump 66 might begin to operate only after the fluid level in tank 12 rises to within a certain level (e.g., within three feet of the top of tank 12). In some cases, hydrocyclone feed pump 66 might begin to operate automatically when the fluid level rises to a particular level (e.g., within three feet from the top of tank 12).

With reference to FIGS. 1-3, system 10 may include conduit 70 operatively associated with or fluidly connected to hydrocyclones 58. Conduit 70 returns the overflow from hydrocyclones 58 (processed fluid) back to compartment 13 of tank 12. The underflow from hydrocyclones 58 (solids) are deposited on linear shaker 64 for dewatering and then conveyed to slide 108 (not shown) where the dewatered solids fall into catcher device 128 (not shown) for discarding. The incline of the shaker 64 may be adjusted depending on desired dryness and conveyance of solids/material. The shaker 64 may include a flexible dam on the discharge end to enhance the dewatering of the material. Once enough weight builds up behind the dam, the dam may fold over and release the solids/material. The tension on the dam can be increased by adding a bungee strap which will increase the amount of weight required for the dam to release the material, such as to hold the material longer in order to achieve drier material.

As seen in FIGS. 3, 4a, and 4b, compartment 13 of tank 12 may contain internal area 72 for housing the slurry undergoing processing (after it passes through degassers 52). One or more baffles may be operatively positioned within internal area 72. For example, baffles 74a, 74b, and 74c may be operatively positioned at the mid-section 76 of internal area 72 in spaced relation. Additionally, baffles 74d, 74e and 74f may be operatively positioned in front section 78 of internal area 72 in spaced relation. Baffles 74a-74f may extend or hang from the top of tank 12. Baffles 74a-74f may be tapered at their sides and in the direction of bottom wall 22 to conform to the V-shaped profile of compartment 13. Baffles 74a-74f may also be angled or tilted. Baffles 74a-74f may be tilted at an angle in the range of 45 degrees to 90 degrees relative to the horizontal ground. In some embodiments, baffles 74a-74f may be tilted in the direction of fluid flow through compartment 13 of tank 12. Baffles 74a-74f may all be tilted in the same direction. For example, as shown in FIG. 4a, baffles 74a-74f may be tilted such that the lower portions of baffles 74a-74f may be positioned closer to the front of tank 12. In some embodiments, one or more of baffles 74a-74f may be tilted in different directions relative to other baffles 74a-74f. For example, as shown in FIG. 4b, baffles 74a-74c may be tilted such that the lower portion of baffles 74a-74c may be positioned closer to the back of tank 12, and baffles 74d-74f may be tilted such that the lower portion of baffles 74d-74f may be positioned closer to the front of tank 12. Baffles 74a-74f may be operatively positioned within compartment 13 such that the bottom edge of each baffle 74a-74f is in the range of approximately 1 foot to 5 feet from the bottom of compartment 13. In some embodiments, this distance may be about 3 feet. The top edge of each baffle 74a-74f may be in the range of approximately zero to approximately 36 inches from the top of compartment 13. In some embodiments, this distance may be approximately 15 3/8 inches. Baffles 74a-74f may be constructed as separate units or formed as one or more baffle modules. For example, baffles 74a-74c may be constructed as a first baffle module. Baffles 74d-74f may be constructed as a second baffle module. Baffles 74a-74f (either singularly or in modules) may be made of metal (e.g., steel), plastic, or polymer, and may be either inserted into compartment 13 and attached thereto by welding, bolts, rivets, and the like or made unitary with compartment 13.

FIGS. 3 and 4a show that internal area 72 may also partially contain conduit 70. Outlet 80 of conduit 70 discharges the overflow (processed fluid) from hydrocyclones 58 into possum belly 82 operatively positioned within internal area 72. Possum belly 82 may be fixedly (by welding) or detachably (by bolts, rivets or the like) attached to compartment 13. Possum belly 82 may be perforated. Possum belly 82 is a vessel that initially contains the overflow discharged from outlet 80, which then flows through the perforations into internal area 72. In some cases, possum belly 82 may be substantially aligned with outlet 80. In some cases, the grate of the possum belly 82 may be positioned adjacent to and behind outlet 80 closer to the rear of tank 12 to allow discharge from outlet 80 to flow through possum belly 82. Possum belly 82 is commercially available from DEL Corporation under the trade name perforated possum belly.

As seen in FIGS. 3 and 4a, front section 78 of compartment 13 may include oil skimmer 84. Oil skimmer 84 may be operatively positioned in internal area 72 so that fluid in compartment 13 passes over oil skimmer 84 before reaching overflow pipe 88. Oil skimmer 84 may be fixedly (by welding) or detachably (by bolts, rivets or the like) attached to compartment 13. Oil skimmer 84 may be substantially horizontally oriented. The height of overflow pipe 88 may be adjustable. For example, the height of the overflow pipe 88 can be set 12-14 inches below the top of the rim of the tank 12 and may be adjustable in the range of 4 inches below the top rim of the tank 12 to 20 inches below the top rim of the tank 12. In some cases, the overflow pipe may operate only when the height of overflow pipe 88 is greater than 6 inches from the top of tank 12. In some cases, oil skimmer 84 may be adjustable in height, such that skimmer 84 may be movable up and down depending on the position of the oil level in tank 12. In some cases, the oil skimmer 84 may be set at least two inches higher than the height of the overflow pipe 88. Oil skimmer 84 may be a slotted skimmer pipe that skims any oil present on the surface of the fluid within compartment 13. Oil skimmer 84 is commercially available from DEL Corporation under the trade name horizontal oil skimmer or horizontal pipe oil skimmer FIGS. 3 and 4a also reveal that front section 78 may include underflow weir 86. Underflow weir 86 may be operatively positioned in internal area 72 directly adjacent to overflow pipe 88. Underflow weir 86 may be positioned vertically within internal area 72. The bottom edge of weir 86 may be in the range of approximately 1 foot to 7 feet from the bottom of compartment 13. The top edge of weir 86 may be in the range of zero to approximately 60 inches from the top of compartment 13. Underflow weir 86 prevents floating debris (particularly oversized debris) from gaining entrance to overflow pipe 88. Underflow weir 86 also prevents oil from gaining entrance to overflow pipe 88. While the location of underflow weir 86 relative to the location of oil skimmer 84 is shown to be closer to overflow pipe 88, the positions can be switched such that oil skimmer 84 may be located closer to the overflow pipe 88 in some embodiments.

As also seen in FIGS. 3 and 4a, front section 78 may include overflow pipe 88 through which clean effluent or fluid (solids substantially removed), processed in system 10, flows out of tank 12 to equalize with the frac tanks (not shown) and then is recirculated back down the well.

FIGS. 3 and 4a show the placement of shaftless auger 92 at the bottom of compartment 13 of tank 12. Auger 92 is commercially available from Falcon Industries, Inc. under the trade name Shaftless Screw Conveyor. Auger 92 extends substantially the length of compartment 13 from internal rear section 94 to front section 78. Auger 92 is operatively connected to auger motor 96, which serves to rotate auger 92 to facilitate the movement of solids that have settled to the bottom of internal area 72 in the direction from front section 78 to rear section 94. Motor 96 may be an electric motor commercially available from Weg Electric Corp. under the trade name electric motor. Motor 96 may also be a pneumatic or hydraulic motor. Motor 96 may be controlled by a variable frequency drive (VFD) so that the speed of rotation may be varied. Thus, the operator may vary the speed of rotation of auger 92 so that the shaftless auger 92 may vary the concentration of solids going to hydrocyclone feed pump 66. For example, the operation of auger 92 may convey a heavier concentration of solids to hydrocyclone feed pump 66 (by decreasing rotation speed) or alternatively may convey a reduced concentration of solids to hydrocyclone feed pump 66 (by increasing rotation speed). In some embodiments, a variable frequency drive (VFD) on hydrocyclone feed pump 66 can vary the speed and/or pump pressure of the pump 66, which may vary the flow rate and/or concentration to pull more or less liquid into the hydrocyclone feed pump 66. The speed and/or pump pressure of the pump 66 can be monitored and adjusted by adjusting the VFD. The pump pressure may be any suitable pressure, such as between approximate 5 to 40 psi. In some embodiments, the pump pressure may be initially operated at about 20 psi and may be maintained between 15-20 psi. In some cases, the speed of the motor 96 may be 900 rpm, or any suitable speed. In some cases, the auger 92 may start to operate after hydrocyclone feed pump 66 is energized.

Auger 92 may include half pitch section 98 and a full pitch section 100. Full pitch section 100 is located at rear section 94 at or near the intake of hydrocyclone feed pump 66. In half pitch section 98, flights of auger 92 are spaced apart in the range of about 4.5 inches to about 9 inches. In full pitch section 100, flights of auger 92 are spaced apart in the range of about 9 inches to about 18 inches. The flights may have a diameter in the range of 9 inches to 18 inches, for example 12 inch diameter. In one embodiment, the diameter of the flights may be the same as the distance between flights in the full pitch section. Solids settled in half pitch section 98 exhibit an increase in the height as compared to the solids settled in full pitch section 100. The reduction of solid height at full pitch section 100 reduces clogging at the inlet of hydrocyclone feed pump 66. In some cases, auger 92 may automatically begin to operate when hydrocyclone feed pump 66 is energized.

Figure 5A:
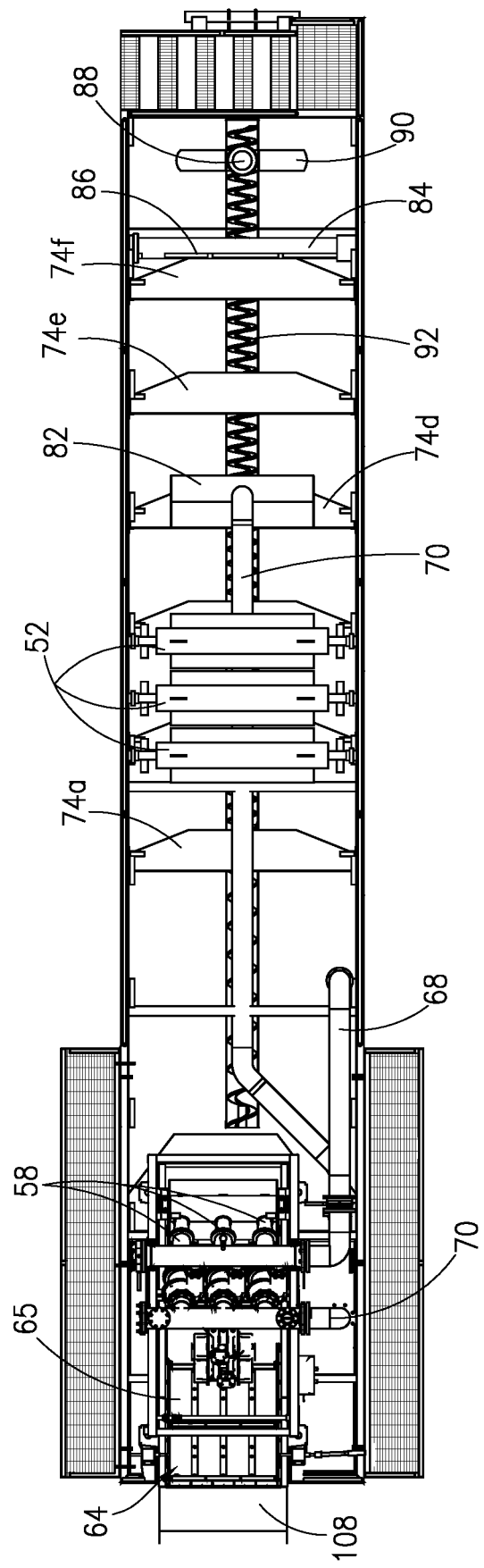
FIG. 5a is a partial cross-sectional top view of an embodiment of the flow back separation system.
Figure 5B:
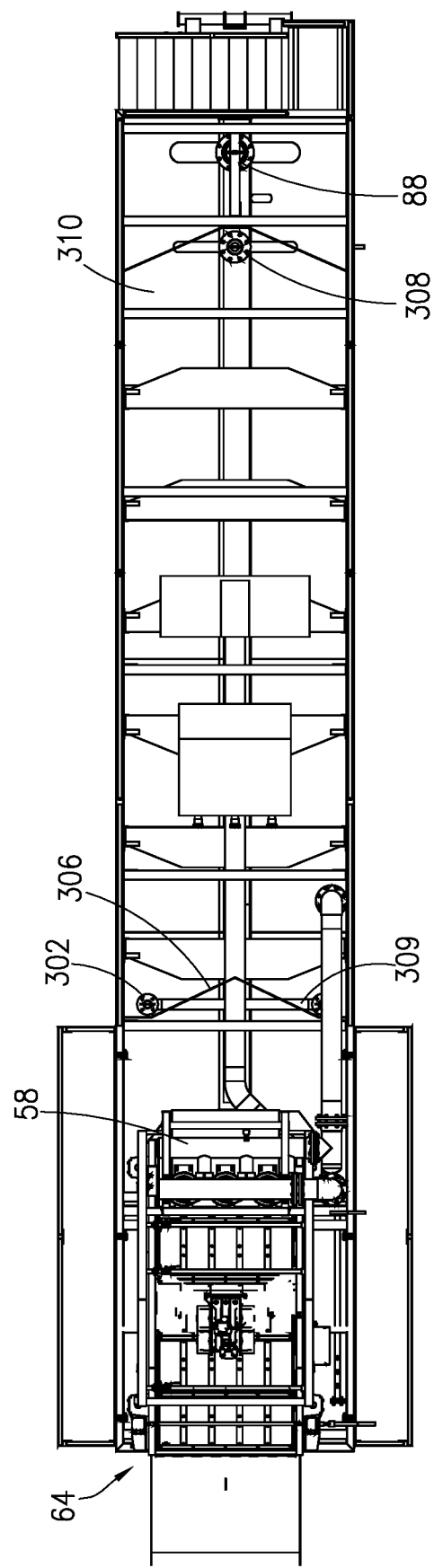
FIG. 5b is a partial cross-sectional top view of an embodiment of the flow back separation system.

As seen in FIGS. 4a and 5a, system 10 may include linear shaker 64. Linear shaker 64 may contain vibrating screen media 65 that function to dewater and dry solids discharged onto screens 65. In some embodiments, the vibrating screen media 65 may include one or more vibrating mesh screens that may be made of metal, such as stainless steel. In some embodiments, the vibrating screen media 65 may include one or more polyurethane slotted screens. Linear shaker 64 is commercially available from DEL Corporation under the trade name Linear Shaker. The underflow or solids discharged out of bottom 104 of each hydrocyclone 58 onto proximal end 106 of linear shaker 64 and are screened by linear shaker 64 to dewater or dry the discharged solids. The dried solids are conveyed on screens 65 to slide 108 positioned at distal end 110 of the linear shaker 64. FIG. 4b shows an arrangement for screens 65, where the screens 65 may be angled relative to the ground. Dried solids conveyed to slide 108 are deposited into catcher device 128 (not shown) for haul off. FIG. 5b illustrates an alternative embodiment of the flow back separation system 10. As shown in FIG. 5b, two oil skimmers 302 may be positioned in tank 12 at the rear of tank 12. Oil skimmers 302 may be vertical oil skimmers. In some cases, oil skimmers 302 may be adjustable in height, such that skimmers 302 may be movable up and down depending on the position of the oil level in tank 12. In some cases, the oil skimmers 302 may be set at least two inches higher than the height of the overflow pipe 88. Oil skimmers 302 may be respectively positioned on a first side and a second side of tank 12. Oil skimmers 302 may be connected by horizontal pipe 309. Oil skimmers 302 may function to skim oil from fluid inside of tank 12, where the skimmed oil may flow out through pipe 309. A baffle 306 may extend behind the oil skimmers 302 at the rear of tank 12. Baffle 306 may be V-shaped, similar to baffles 74a-74f. Oil skimmer 308 may be positioned in tank 12 at the front of tank 12. Oil skimmer 308 may be located at a central location in the tank 12. A baffle 310 may extend in front of the oil skimmer 308 at the front of tank 12 between oil skimmer 308 and overflow pipe 88. Oil skimmer 308 may be a vertical oil skimmer Baffle 310 may be V-shaped, similar to baffles 74a-74f.

Figure 7:
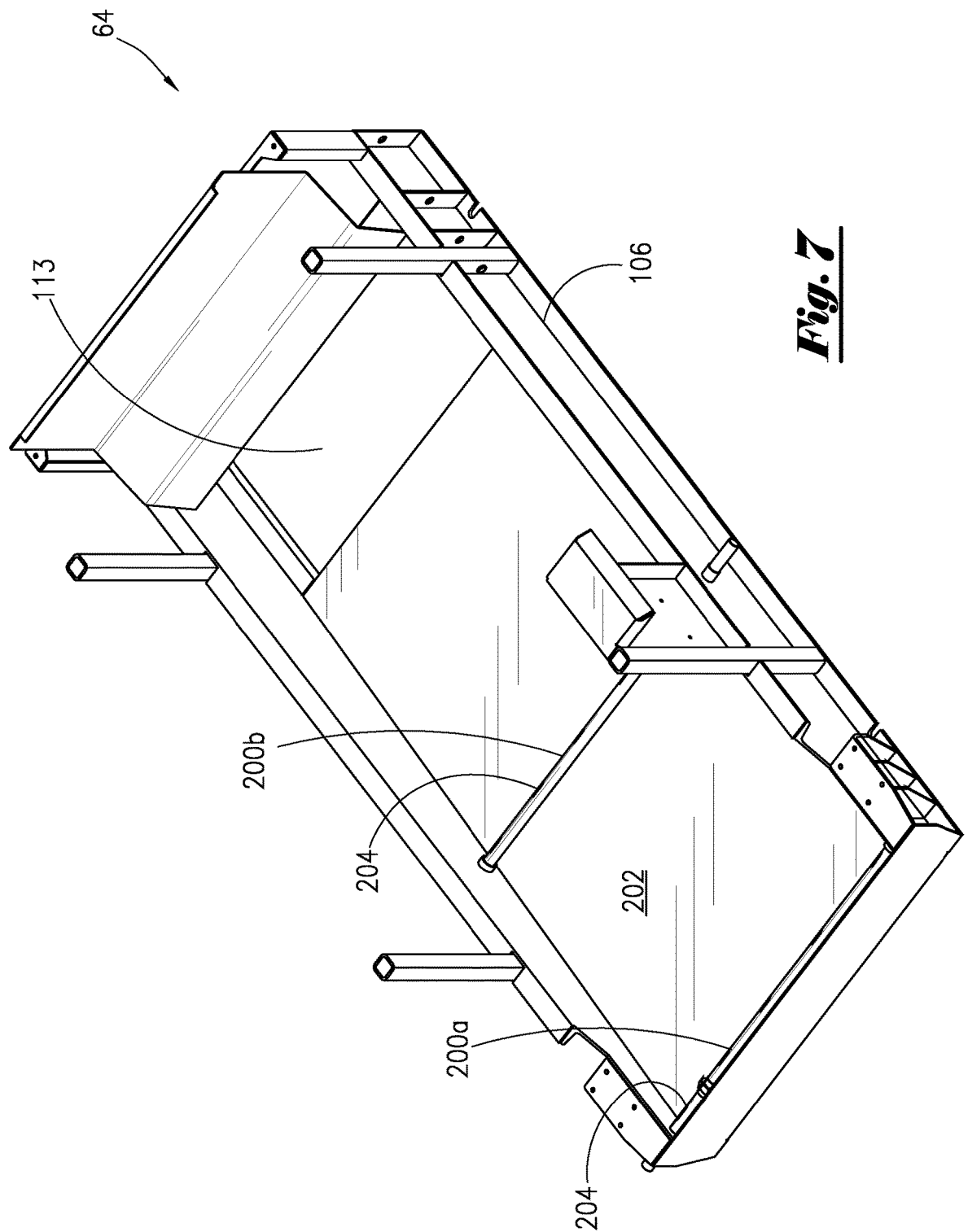
FIG. 7 is a perspective view of the bed of a linear shaker.

As seen in FIGS. 6 and 7, flow back separation system 10 may include spray bar pump 320 in fluid communication with a spray bar conduit 322, which may transport clean fluid from the front end of the tank 12 to shaker 64. Spray bar pump 320 may generate a maximum flow rate of about 300 gpm. Spray bar pump 320 is commercially available from PSI under trade name Centrifugal Pump. FIG. 7 shows the arrangement of slotted pipes 200a, 200b in bed 202 of linear shaker 64. Spray bar conduit 322 is also in fluid communication with one or more slotted pipes 200a, 200b operatively connected to bed 202 of shaker 64. Flow lines 112a, 112c extending from the spray bar conduit 322 may respectively connect to pipes 200a, 200b in bed 202 of linear shaker 64 to provide the clean fluid provided via the spray bar pump 320. Flow line 112b extending from the spray bar conduit 322 may connect to spray bar rack 111 of linear shaker 64 to provide the clean fluid provided via the spray bar pump 320. Slotted pipes 200a, 200b may each be approximately 1¼inch pipe, or any suitable size. The fluid flowing through lines 112a, 112b, 112c and out of slotted pipes 200a, 200b (through slots 204) and spray bar rack 111 washes any solid (e.g., sand) build-up in bed 202 of linear shaker 64, with the underflow from linear shaker 64 and the flow from pipes 200a and 200b exiting at proximal end 106 through pan opening 113 and flowing back into compartment 13 at internal wall 17. In some cases, slots 204 may be directed toward the proximal end 106 such as to provide fluid directed toward proximal end 106 and pan opening 113. In some cases, bed 202 may be angled toward the proximal end 106. A remote start/stop operation for spray bar pump 320 may be used to operate the spray bar pump 320.

FIG. 8 is a flow diagram showing the processing of the slurry. Slurry 116 containing solids mixed in fluid is pumped to degassers 52. In one embodiment, slurry 116 may be pumped to degassers 52 via respective slurry flow lines 116*a*, 116*b* for each degasser 52. In some embodiments, slurry 116 may be divided for flow into each of the degasser units 52. As shown in FIGS. 4-8, processed slurry 118 is discharged from the bottom of the degassers 52 and enters internal area 72 of compartment 13. Processed slurry 118 flows down baffles 74*a*, 74*b*, 74*c* at mid-section 76 of internal area 72. Solids 120 contained in processed slurry 118 will settle to the bottom of internal area 72. Solids 120 will be conveyed via auger 92 towards pump 66 and will advance through the inlet in conduit 68 and pumped (with fluid) therethrough to hydrocyclones 58.

As seen in FIGS. 4-8, hydrocyclones 58 will process the fluid mixture containing solids 120 by separating solids 122 from fluid 124. Solids 122 will be discharged from bottom 104 of hydrocyclones 58 and onto shaker screens 65 of the linear shaker 64. Solids 122 will be dewatered. Dewatered solids 126 will be conveyed on shaker screens 65 to catch device 128. Fluid 124 (substantially free of solids 122) will be discharged from top 114 of hydrocyclones 58 and flow through conduit 70 back to internal area 72 of compartment 13. Fluid 124 will be discharged into possum belly 82 where fluid 124 will flow over baffles 74*e*, 74*f* at front section 76 of internal area 72.

Again with reference to FIG. 8, any remaining solids 120 in fluid 124 will settle to the bottom of internal area 72 and be conveyed via auger 92 back to hydrocyclones 58 for further processing of the solids. Fluid 124 flows over baffle 74*f* positioned adjacent to oil skimmer 84, which removes oil floating on fluid 124. Fluid 124 then flows under underflow weir 86 and into the front section where overflow pipe 88 is positioned. Overflow fluid 130 (substantially free of solids) flows into overflow pipe 88 and clean effluent or fluid 132 exits tank 12 and equalizes with the frac tanks (not shown) for reuse or recirculation in well completion operations.

In operation, slurry 116 from a well undergoing completion or other operations enters degassers 52 mounted on top of tank 12. Degassers 52 discharge into the middle of the compartment 13 over the tilted plate baffles 74*a*—74*c*. Baffles 74*a*—74*c* help to evenly distribute the solids, diminish turbulence and slow the velocity of solids in order to enhance settling. The solids that enter compartment 13 settle to the bottom and are then conveyed by shaftless auger 92 to the inlet of hydrocyclone feed pump 66 near internal wall 17.

Hydrocyclone feed pump 66 pumps slurry 120 to hydrocyclones 58 (approximately 1200 gpm), which are mounted over linear shaker 64. The underflow of hydrocyclones 58 (approximately 200 gpm) discharges onto linear shaker 64, equipped with 50-400 screens 65, where the solids are dewatered and conveyed off the rear end of tank 12, through slide 108, into catch device 128. In some cases, spray bar pump 320 and spray bar conduit 322, which may transport clean fluid from the front end of the tank 12 to linear shaker 64. Catch device 128 may be a container, catch box, or conveyor. Catch device 128 may be used to haul the recovered solids 126 offsite for disposal.

The underflow of linear shaker 64 (fluid and some solids not screened by linear shaker 64) discharges into compartment 13 near the inlet to hydrocyclone feed pump 66 and is recycled back through hydrocyclones 58. If one of the screen panels in linear shaker 64 develops a hole, solids (e.g., sand) passing through the hole would not contaminate the clean effluent overflow 130 flowing to the frac tanks. Instead, due to the location of the shaker underflow discharge, it would be recycled back through hydrocyclones 58 for removal.

The overflow of hydrocyclones 58 (approximately 1000 gpm) is such that the fluid (approximately 1000 gpm) is discharged into perforated possum belly 82 in the mid-section 76 of compartment 13. The flow from the well is typically around 250 gpm therefore 250 gallons per minute of the hydrocyclone overflow that discharges into perforated possum belly 82 will flow through tilted plate baffles 74*e*, 74*f* towards the overflow at the front of tank 12. Approximately 750 gpm of the remaining slurry, along with any solids/sand that might have made it into the hydrocyclone overflow, will flow back through tilted plate baffles 74*a*—74*c*.

The solids/sand will settle to the bottom of compartment 13 and be conveyed back to hydrocyclone feed pump 66 by shaftless auger 92 for removal by hydrocyclones 58. This prevents any solids/sand from contaminating the clean effluent overflow to the frac tanks even if the hydrocyclones 58 experience roping. The clean effluent will continue to the overflow and out to equalize with the frac tanks and then recirculated back down the well. In addition to the tilted plate baffles 74*e*, 74*f*, a vertical underflow baffle (weir 86) is positioned just ahead of the overflow 88 to prevent any floating oversize debris from exiting the overflow 88 to the frac tanks. Tank 12 may also be equipped with slotted horizontal skimmer pipe 84 or vertical skimmer pipe 308 just ahead of the vertical underflow baffle (weir 86) to accommodate skimming of oil if present during production applications.

Shaftless auger 92 in the bottom of compartment 13 is comprised primarily of half pitch flighting 98, but a short section 100 of full pitch is utilized on the end near hydrocyclone feed pump 66 to reduce the height of the sand being conveyed and therefore eliminating clogging of the pump suction 66. The speed of auger 92 can be varied by the VFD in order to regulate the concentration of the sand slurry being conveyed to the inlet of hydrocyclone feed pump 66. In some embodiments, a VFD on hydrocyclone feed pump 66 can vary the speed of the pump 66, which may vary the concentration to pull more or less liquid into the hydrocyclone feed pump 66.

Spray bar pump 320 can operate to recirculate and distribute clean fluid from the overflow end of the tank through spray bar conduit 322 to slotted pipes 200*a*, 200*b* connected to bed 202 of shaker 64. Spray bar nozzles on shaker 64 can be regulated with ball valves located on each slotted pipe 200*a*, 200*b*.

According to features described herein, dimensions are approximate and may be scaled to size based on desired sizing and scaling.

While preferred embodiments of the disclosure have been described, it is to be understood that the embodiments described are illustrative only and that the scope of the disclosure is to be defined solely by the appended claims when accorded a full range of equivalence, many variations and modifications naturally occurring to those skilled in the art from a perusal hereof.

What is claimed is:

1. A system for separating solids from a slurry recovered from a hydrocarbon well, comprising:
    a tank having side walls, a bottom, and a top, the tank having a front section, a mid-section, and a rear section;
    a degassing unit operatively associated with the tank, the degassing unit removing an entrained gas from the slurry and discharging a first slurry into the tank whereby a first settling of a first solids within the first slurry takes place;

a conveying device operatively positioned within the tank, the conveying device configured to cause the first solids to move proximate to an inlet of a first conduit operatively positioned within the tank;

a pump in fluid communication with the first conduit, the pump configured to pump a second slurry containing the first solids through the first conduit;

a hydrocyclone unit in fluid communication with an outlet of the first conduit, the hydrocyclone unit receiving and processing the second slurry to produce an overflow comprising a first clean fluid and an underflow comprising the first solids;

a shaker operatively associated with the hydrocyclone unit, the shaker configured to receive the underflow from the hydrocyclone unit and to cause a dewatering of the first solids to produce a dried first solids, the shaker further configured to convey the dried first solids for disposal or reuse, the shaker producing an underflow comprising a third slurry comprising a second solids, the shaker configured for depositing the third slurry into the tank for recirculation through the first conduit to the hydrocyclone unit;

a second conduit having an inlet and an outlet, the inlet of the second conduit in operative association with the hydrocyclone unit to receive and provide a flow path for the overflow comprising the first clean fluid, the outlet of the second conduit operatively positioned within the tank for discharge of the overflow comprising the first clean fluid therein; and an overflow device operatively positioned within the tank, the overflow device configured to provide an outlet for the first clean fluid to exit the tank.

2. The system of claim 1, wherein the rear section of the tank includes a sloped internal wall, the sloped internal wall configured to provide a pathway for the underflow from the hydrocyclone unit so that the first solids settle proximate to the inlet of the first conduit.

3. The system of claim 2, wherein an angle of the sloped internal wall is in the range of 30 degrees to 90 degrees relative to a horizontal ground reference.

4. The system of claim 1, further comprising a possum belly operatively positioned within the tank directly adjacent to the outlet of the second conduit.

5. The system of claim 4, wherein the possum belly is perforated to permit the overflow discharged from the outlet of the second conduit to flow there-through.

6. The system of claim 1, further comprising an oil skimmer operatively positioned within the tank.

7. The system of claim 6, wherein the oil skimmer is a horizontal oil skimmer or a vertical oil skimmer.

8. The system of claim 1, further comprising one or more oil skimmers positioned within the tank at its rear section.

9. The system of claim 8, wherein the one or more oil skimmers comprise two oil skimmers respectively positioned on a first side and a second side of the tank.

10. The system of claim 8, further comprising a back baffle positioned at the rear section of the tank extending behind the one or more oil skimmers at the rear section of the tank, the back baffle configured to direct flow of the first clean fluid to the one or more oil skimmers.

11. The system of claim 1, wherein the conveying device is a shaftless auger comprising a full pitch section and a half pitch section, wherein the full pitch section is operatively positioned at the rear section of the tank.

12. The system of claim 11, wherein full pitch section comprises a first series of flights, each flight spaced apart from an adjacent flight by a distance in the range of 9 inches to 18 inches, and wherein the half pitch section comprises a second series of flights, each flight spaced apart from an adjacent flight by a distance in the range of 4.5 inches to 9 inches.

13. The system of claim 1, wherein the shaker is a linear shaker having a proximal end that discharges the underflow, and wherein the proximal end is operatively positioned at the rear section of the tank.

14. The system of claim 13, further comprising a slide operatively associated with a distal end of the linear shaker, the slide configured to receive the dried first solids from the linear shaker and discharge the dried first solids from the linear shaker.

15. The system of claim 1, further comprising a deck operatively positioned over the top of the tank.

16. The system of claim 15, further comprising a guard rail extending around a periphery of the deck.

17. The system of claim 1, further comprising a support frame operatively positioned about and supporting the tank.

18. The system of claim 17, further comprising a plurality of wheels operatively associated with the support frame, the plurality of wheels positioned at a back of the tank, the plurality of wheels providing mobile transport of the tank.

19. The system of claim 1, further comprising a spray bar pump in fluid communication with a spray bar conduit, wherein the spray bar pump is configured to pump the first clean fluid from the tank to the shaker via the spray bar conduit.

20. The system of claim 19, wherein the shaker includes one or more slotted pipes in fluid communication with the spray bar conduit, the one or more slotted pipes being operatively positioned adjacent a bed of the shaker, the one or more slotted pipes being configured to discharge a portion of the first clean fluid into the bed to prevent a buildup of the second solids.

21. The system of claim 1, wherein the degassing unit is operatively positioned over the top of the tank.

22. The system of claim 1, wherein the pump comprises a suction pump.

23. The system of claim 1, wherein the shaker is configured to convey the dried solids to a storage device.

24. The system of claim 1, wherein the overflow device comprises a pipe.

25. The system of claim 1, further comprising a first settling device operatively positioned within the tank, the first settling device configured to cause the first settling of the first solids within the first slurry.

26. The system of claim 25, wherein the first settling device comprises a first series of baffles.

27. The system of claim 26, wherein the degassing unit is operatively positioned over the top of the tank and wherein the first series of baffles are operatively positioned below the degassing unit.

28. The system of claim 26, further comprising a second series of baffles operatively positioned within the tank, the second series of baffles configured to cause a second settling of a third solids, and wherein the first series of baffles is slanted in a first direction and the second series of baffles is slanted in a second direction.

29. The system of claim 25, further comprising a second settling device operatively positioned within the tank, the second settling device configured to cause a second settling of a third solids.

30. The system of claim 29, wherein the second settling device comprises a second series of baffles.

31. The system of claim 30, further comprising an underflow weir operatively positioned within the tank directly adjacent to a last baffle comprising the second series of baffles, the underflow weir configured to cause the first clean fluid to flow under the underflow weir.

* * * * *